United States Patent
Parmater

[15] 3,660,759
[45] May 2, 1972

[54] METER CONNECTION ADAPTER FOR AUTOMOBILE ELECTRICAL SYSTEM TESTER INCLUDING DIODE AND SHORTING SWITCH THEREFOR

[72] Inventor: Lee Parmater, Plainwell, Mich.
[73] Assignee: Kal-Equip Company, Otsego, Mich.
[22] Filed: Mar. 19, 1970
[21] Appl. No.: 20,925

[52] U.S. Cl. .................................324/29.5, 200/52, 320/48
[51] Int. Cl. .........................................................G01n 27/46
[58] Field of Search....................324/29.5; 340/249; 200/52; 320/48

[56] References Cited

UNITED STATES PATENTS

| | | | |
|---|---|---|---|
| 2,084,086 | 6/1937 | Heyer | 324/29.5 |
| 3,345,491 | 10/1967 | Badger et al. | 324/29.5 X |
| 3,371,330 | 2/1968 | Howard et al. | 340/249 |
| 2,975,352 | 3/1961 | Ford | 320/48 X |
| 1,772,217 | 8/1930 | Heyer | 324/29.5 |
| 2,066,058 | 12/1936 | Simpson | 324/29.5 |
| 3,166,650 | 1/1965 | Heidrich | 324/29.5 X |

*Primary Examiner*—Gerard R. Strecker
*Attorney*—Ostrolenk, Faber, Gerb & Soffen

[57] ABSTRACT

A length of flexible conductive wire acts as a shunt for a voltage-current meter for an automotive test device. One end of the wire is connected to a connector adapted to be connected to an automotive battery terminal and its other end is connected to a conductive body housing having a stud which can receive the automotive battery terminal. The body housing contains a diode and a shorting switch for the diode where the forward resistance of the diode can be connected in series with the shunt during voltage regulator tests and is short-circuited by the switch during motor starting.

9 Claims, 10 Drawing Figures

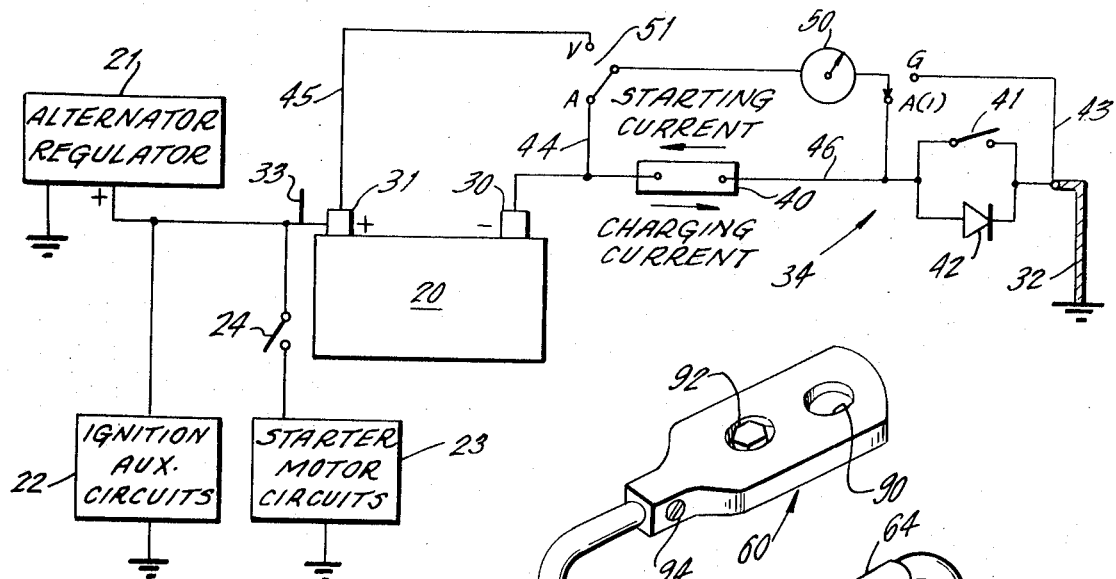
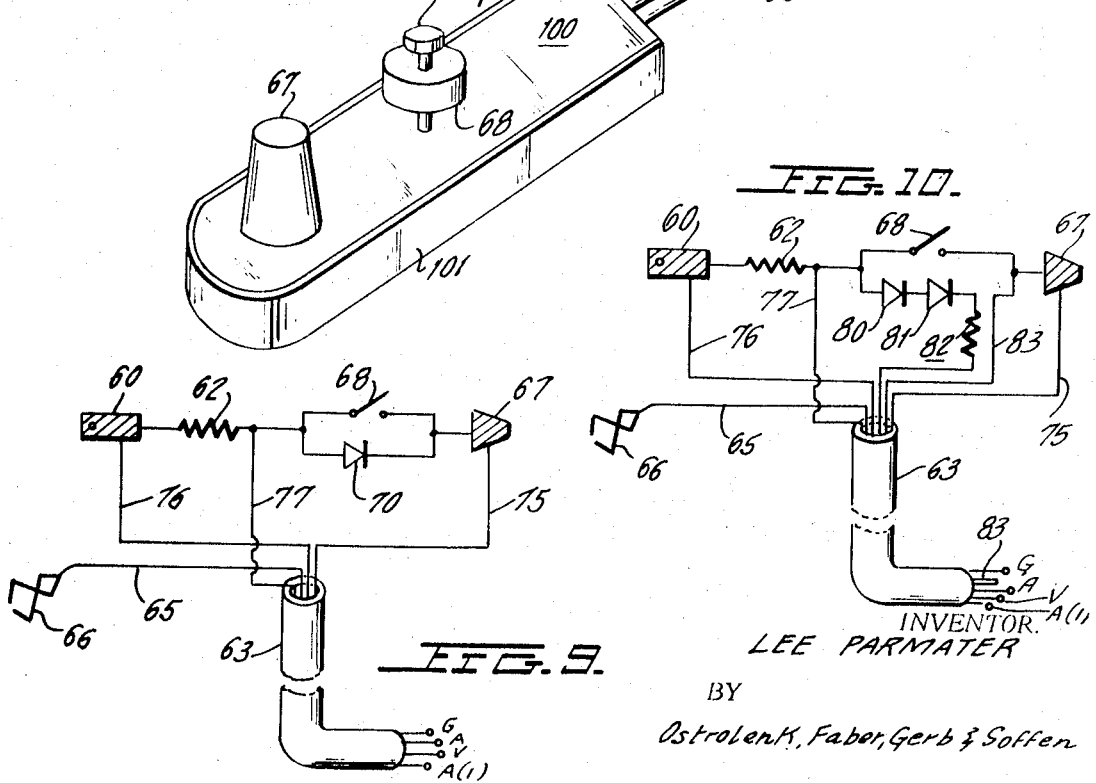

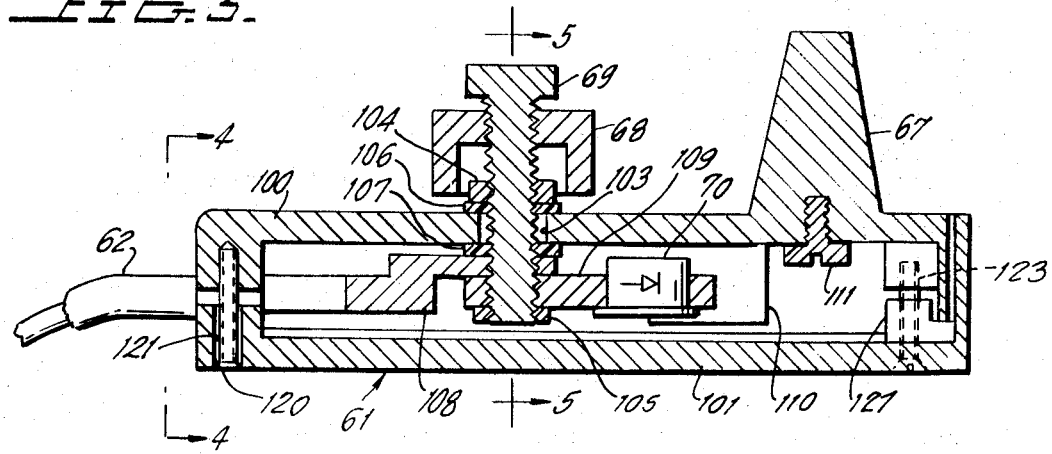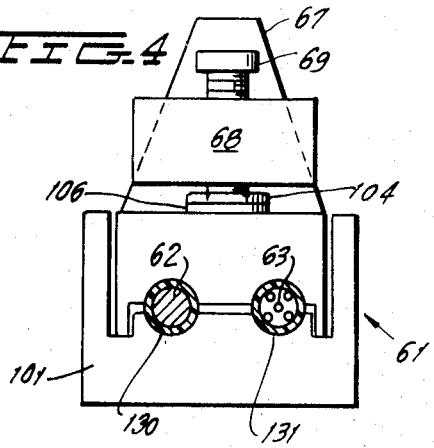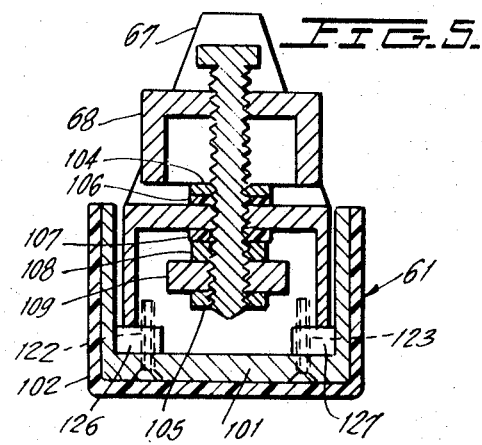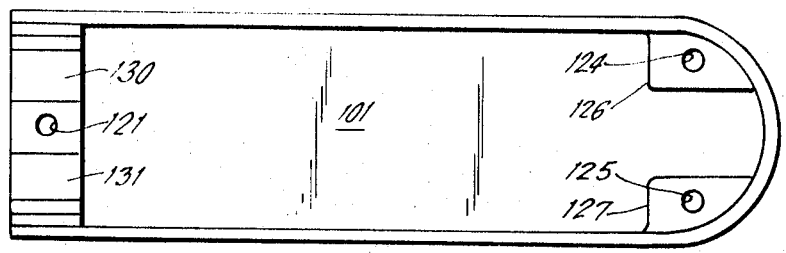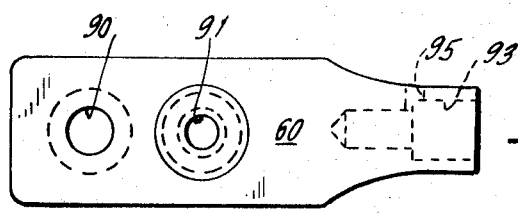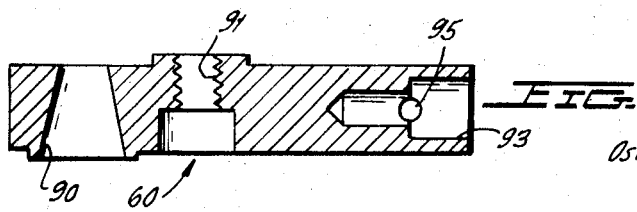

METER CONNECTION ADAPTER FOR AUTOMOBILE ELECTRICAL SYSTEM TESTER INCLUDING DIODE AND SHORTING SWITCH THEREFOR

BACKGROUND OF THE INVENTION a. Field of the Invention

This invention relates to an adapter for automotive test equipment, and more particularly relates to a novel circuit for such adapters which employs a diode and shorting switch therefor, and to a novel mechanical arrangement for such adapters.

b. Prior Art

When making various types of tests of automotive electrical circuits, it is necessary to connect test instruments in series with certain components. For example, to test the motor starting circuit and the battery charging circuits (including the conventional alternator and regulator), it is necessary to connect an instrument in series with the automobile battery. Adapters have been provided for this purpose which are simply insulated terminals, one of which is adapted to fit on a standard battery post, and the other being adapted to receive the battery cable which otherwise is connected to the battery post receiving the adapter. A manual switch is also provided for connecting the insulated adapter terminals to one another. Devices of this type are shown in U.S. Pat. No. 3,166,650 to Heidrich. In such devices, the adapter is a one-piece member and operates to permit a meter shunt, built into a separate test ammeter, to be connected in series with the battery. The switch is provided to connect the adapter terminals to permit starting of the vehicle.

Another type adapter is known in which a shunt is built into the adapter device so that simpler metering equipment can be used. These latter devices have also employed resistors, formed of a relatively long length of wire (to permit rapid cooling) which are connected in series with the built-in shunt, and which are provided with a normally closed shorting switch. This resistor is connected in the test circuit during regulator voltage tests and acts to simulate a fully charged battery because of the voltage drop on the resistor which is additive with the battery voltage. A shorting switch is used to short-circuit the resistor during motor starting conditions when the current is sufficiently high to burn out the small wire used for the resistor.

It has been found that the resistor of the above-described adapter can also be damaged during motor starting when the shorting switch contact resistance is too high, causing a relatively high starting current to flow through the resistor. Moreover, it has been found that the one-piece adapter units carrying means for connection to both battery post and battery cable is relatively expensive and complex.

SUMMARY OF THE INVENTION

The present invention uses the forward resistance of a diode as at least a part of the resistance used during the voltage regulator test, and forms an adapter shunt from a cable which connects a separate battery post connector body and battery cable connector body. The battery cable connector body also serves as the housing for the diode and its shorting switch. The shorting switch may also be of an inexpensive type since it does not have to be closed to prevent burn-out. That is, high motor starting currents cannot flow through the diode since the diode is reverse-biased by motor starting current.

BRIEF DESCRIPTION OF THE DRAWINGS

FIG. 1 is a circuit diagram of the adapter of the present invention as applied to an automotive vehicle.

FIG. 2 is a perspective diagram of the adapter of the invention.

FIG. 3 is a longitudinal cross-sectional view of the adapter housing of the invention.

FIG. 4 is a cross-sectional view of FIG. 3 taken on the section line 4—4 of FIG. 3.

FIG. 5 is a cross-sectional drawing of FIG. 3 taken on the section line 5—5 of FIG. 3.

FIG. 6 is a plan view of the top of the lower housing portion of the adapter housing.

FIG. 7 is a plan view of the battery terminal connector of the invention.

FIG. 8 is a cross-sectional view of FIG. 7 taken on section line 8—8 in FIG. 7.

FIG. 9 is a circuit diagram of the adapter structure of FIGS. 2 to 8.

FIG. 10 is a circuit diagram of a modified adapter using a resistor in series with the diode of FIG. 9.

DETAILED DESCRIPTION OF THE DRAWINGS

Referring first to FIG. 1 there is shown a portion of the electrical system of a conventional internal combustion engine driven vehicle. The electrical system includes battery 20, a schematically-illustrated alternator-regulator system 21 which is conveniently driven from the motor, various output circuits 22, including the ignition and auxiliary circuits (lights etc.) and a conventional starter motor circuit 23 connected in series with starter switch 24. As is well known, the alternator-regulator circuit 21 will provide the necessary electrical power for operation of the various circuits 22 and for charging battery 20 after the motor has been started. The battery 20 provides electrical power when the motor is stopped and operates the starter motor circuit 23 when switch 24 is closed.

The negative terminal 30 of battery 20 is conventionally connected to grounded strap 32. Note that the present invention also applies to systems in which the positive terminal 31 of battery 20 is grounded. The adapter 34 of the invention is connected between the terminal 30 and strap 32. Note that the adapter of the invention can also be connected between the positive terminal 31 and the "live" battery lead 33.

The circuit formed by the adapter 34 consists of a resistive shunt 40 in series with the parallel connection of a switch 41 and a diode 42. The adapter 34 also provides metering leads including a ground lead 43, an ammeter lead 44 and a volt meter lead 45. A common voltage-current meter 50 is then provided which has one terminal connected to lead 43 and a second terminal connected to either lead 44 or lead 45 by connection of a selector switch 51 to switch terminal A or V respectively.

The circuit of FIG. 1 operates as follows: In order to start the vehicle, switch 41 of the adapter circuit is closed to short-circuit diode 42. The automotive starter switch 24 is then closed so that high starting current is drawn from battery 20 through starter circuit 23. Starting current will not flow through diode 42 since it is reverse-biased by battery 20 during starting conditions. Moreover, even if switch 41 makes relatively high resistance contact, the switch voltage drop on diode 42 is in the reverse direction of diode 42 so that current cannot flow through diode 42 due to high switch contact resistance. Starting current may be measured by meter 50 connected across shunt 40 and starting voltage may be measured between leads 43 and 45. For better accuracy, a lead 46 can be provided which is switched between ground terminal G and terminal A(1) by an auxiliary selector switch ganged with switch 51.

Once the automotive engine is started, the alternator-regulator system 21 supplies the necessary electrical power for the automotive system and, moreover, provides a charging current for charging battery 20. The charging current may be measured by meter 50 at shunt 40 via leads 44 and 46, and charging voltage from system 21 may be measured between leads 43 and 45. Clearly, a suitable scale calibration will be provided for meter 50 when making a particular measurement.

In order to test the voltage regulation operation of alternator-regulator 21, it is desirable to connect a small resistance in series with battery 20 to simulate a fully charged battery. To this end, when switch 41 is opened, the forward resistance of diode 42 develops a forward voltage drop which is additive with the voltage between terminals 30 and 31. The conventional voltage regulator which is a part of system 21 sees this relatively high voltage between ground strap 32 and terminal 31 and operates as though the battery 20 is fully charged. In order to test the current regulation operation of system 21, switch 41 is closed and the charging current through shunt 40 is monitored at meter 50.

The adapter structure of the invention is shown in FIGS. 2 to 9. As generally shown in FIG. 2, there is provided a battery terminal connector 60 which is connectible to a standard battery post, a cable connector adapter housing 61, a flexible shunt cable 62, shown as a resistor in FIG. 9 for connecting members 60 and 61, an instrument lead cable 63 terminated by a connector 64, and a volt meter lead 65 terminated by a clip connector 66. Shunt cable 62 may be formed of about 1½ feet of No. 6 flexible wire, covered by an insulation sheath. A ground cable receiving stud 67 extends from housing 61 and a threaded nut 68 mounted on conductive screw 69 forms the movable member of a switch. As will be later seen, the switch is closed when nut 69 is threaded into engagement with the body of adapter 61.

FIG. 9 shows the diode 70 of the invention in parallel with movable switch member 68. As will be later described, diode 70 is mounted in the interior of housing 61. Instrument lead cable 63 contains the four leads 75, 76, 65 and 77, corresponding to leads 43, 44, 45 and 46, respectively, in FIG. 1. These leads are then terminated in connector 64 at connector terminals G, A and V, respectively, corresponding to a common or ground terminal of meter 50 of FIG. 1 and the switch positions A and V, respectively, in FIG. 1.

FIG. 10 shows an embodiment of the invention in which additional forward resistance is provided for the voltage regulator test by the series connection of two diodes 80 and 81. Obviously, additional diodes could be used. In addition, a resistor, schematically shown as resistor 82, could also be provided in series with one or more diodes, such as diode 80, where the resistance is obtained by a long length of conductive wire, shown as wire 83, doubled upon itself one or more times within sheath 63.

FIGS. 3 to 8 show the mechanical construction of connector 60 and housing 61. Connector 60 is shown in FIGS. 7 and 8 and consists of a single conductive body having a conical opening 90 therethrough. Opening 90 is designed to fit onto an automotive battery terminal. A threaded opening 91 is formed in connector 60 and receives a threaded stud 92 (FIG. 2) to permit an alternate method of connection to a circuit receiving the adapter of the invention. An opening 93 is then provided to receive one end of cable 62 which can be connected in place by set screw 94 (FIG. 2) in threaded opening 95 of FIGS. 7 and 8.

The adapter housing 61 is best shown in FIGS. 3 to 6 and consists of a conductive upper housing half 100 and a conductive lower housing half 101 which telescopes over housing half 100. The upper housing half 100 has connector member 67 as an integral part thereof. If desired, an insulation sheath 102 (FIG. 5) may cover the lower half 101. Conductive screw 69 projects through opening 103 in housing half 100 and is held in place by means of nuts 104 and 105. Screw 69 is insulated from housing 100 by insulation washers 106 and 107.

Screw 69 also receives terminal connector 108 connected to the end of shunt wire 62, and aluminum block 109. Aluminum block 109 has diode 70 secured to an opening therein as by a pressure fit, whereby the diode anode is connected to block 109. The diode cathode has a lead 110 which is connected to housing half 100 by screw 111.

Housing halves 100 and 101 are secured together by screws such as screw 120 which passes through opening 121 in housing 101 (FIGS. 4 and 6) and into a threaded opening in half 100; and screws 122 and 123, which pass through openings such as openings 124 and 125 in raised platforms 126 and 127 of half 101, into threaded openings in corresponding platforms in half 100. The halves are then drawn to one another by tightening these screws and may clamp on the cable 62 and instrument sheath 63 passing through openings 130 and 131 in the end of the housing. The ends of the various instrument leads within sheath 63 are then suitably connected to the various components as indicated in FIG. 9 or 10.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. An indicator adapter for automotive testing; said adapter comprising:
   a. first connector means adapted to be connectible to one terminal of an automotive battery, and
   b. second connector means adapted to be connectible to the cable which is normally connected to a terminal of an automotive battery, and
   c. diode means having first and second terminals connected in series with said first and second connector means, and
   d. switch means operable between an open circuit and closed circuit condition, and having first and second terminals connected in parallel with said diode means, and
   e. meter shunt resistance means having first and second terminals connected between and in series with said first connector means and said first terminals of said diode means and said switch means, and
   f. wherein conventional current flow through said shunt resistance means during an automobile charging current test is in the forward conduction direction of said diode means whereby the forward resistance of said diode means simulates the effect of a fully charged battery when said switch means is in its said open circuit condition.

2. The adapter of claim 1 which further includes resistance wire means connected in series with said diode means and in parallel with said switch means.

3. The adapter of claim 1 wherein said first connector means comprises a conductive body separate from said second connector means; said resistive shunt means consisting of a flexible wire connector for mechanically and electrically connecting said first connector means relative to said second connector means.

4. The adapter of claim 1 which includes first and second flexible elongated instrument leads connected to said first and second connectors respectively.

5. The adapter of claim 1 which includes a conductive adapter housing; said diode means being connected within the interior of said adapter housing; said second connector means being connected to the exterior of said housing; said switch means being mounted on said adapter housing.

6. The adapter of claim 5 which includes an insulation sheath on at least portions of the exterior of said adapter housing.

7. The adapter of claim 5 wherein said first connector means comprises a conductive body separate from said adapter housing; said shunt resistance means consisting of a flexible wire connector for mechanically and electrically connecting said first connector means to said adapter housing.

8. The adapter of claim 7 which includes first and second flexible elongated instrument leads connected to said first and second connectors respectively.

9. The adapter of claim 7 wherein said switch means comprises a conductive screw support member secured to said adapter housing and electrically connected to said one terminal of said diode means, and a threaded nut means threaded on said screw support member and threadably movable into and out of engagement with a surface portion of said adapter housing; said second terminal of said diode means being electrically connected to said adapter housing.

* * * * *